May 29, 1951     W. A. WELDEN     2,554,931
PRESSURE COOKER
Filed Feb. 19, 1947
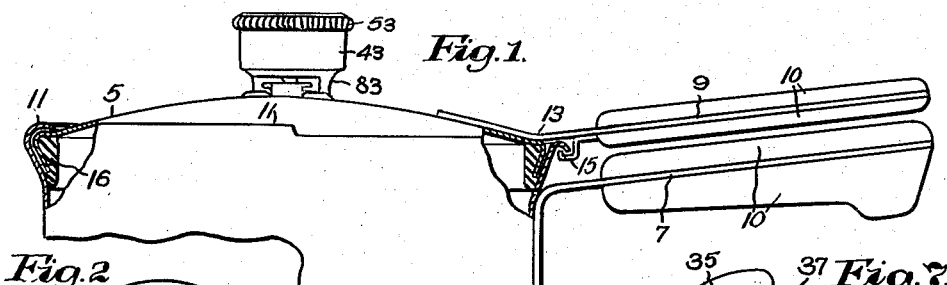
Inventor:
William A. Welden
by Emery Booth, Townsend Miller & Weidner
Attys Patented May 29, 1951

2,554,931

UNITED STATES PATENT OFFICE 2,554,931

PRESSURE COOKER

William A. Welden, Stamford, Conn., assignor to Revere Copper and Brass Incorporated, Rome, N. Y., a corporation of Maryland Application February 19, 1947, Serial No. 729,444

2 Claims. (Cl. 220—44)

My invention relates to pressure cookers.

The invention, which has among its objects the provision of a pressure cooker having an improved pressure relief valve and an improved combined pressure relief valve and pressure indicating gauge, will be best understood from the following description of a specific embodiment of the invention selected for illustrative purposes, while the scope of the invention will be more particularly pointed out in the appended claims.

In the drawings:

Fig. 1 is a side elevation of a pressure cooker according to the invention, with parts in section;

Fig. 2 is a plan view, on an enlarged scale, of a combined pressure relief valve and pressure indicating gauge according to Fig. 1;

Fig. 3 is a side elevation, on an enlarged scale, with parts in section, of the combined pressure relief valve and pressure indicating gauge, and fragment of the pressure cooker cover, according to Figs. 1 and 2, corresponding to a section on the lines 3—3 of Figs. 2 and 4;

Fig. 4 is a section on the line 4—4 of Fig. 3, Fig. 4 being partly diagrammatic in that it shows parts below the section line 4—4 in dotted lines so as to indicate their position with relation to parts above the section line;

Fig. 5 is a side elevation of Fig. 3 as viewed from the right, with parts in section;

Fig. 6 is a side elevation of the combined valve and gauge with the valve moved to a different operative position, parts being in section on the line 6—6 of Fig. 4;

Fig. 7 is a bottom view of the valve seat member; and

Fig. 8 is a fragmentary vertical section through the cover taken longitudinally of one of the raised portions thereof which support the valve in open position, the figure corresponding to a section on the line 8—8 of Fig. 4.

Referring to the drawings, the pressure cooker illustrated, except for the combined valve and gauge, is identical with one illustrated and described in applicant's copending application Serial Number 695,128, filed September 6, 1946, and therefore need not be described with any more particularity than necessary to describe the present invention.

The pressure cooker comprises a metallic container 1 having a closed bottom 3 and an open top, in which top is adapted to be removably received a metallic cover 5. Carried by the container is a laterally extending metallic handle extension 7, and carried by the cover is a laterally extending metallic handle extension 9, each extension carrying handle grips 10. The cover is removably secured to the container by an inwardly turned lip 11 at one side of the container brim, and by an outwardly and downwardly turned lip 13 at the opposite side of the container brim, and the lip 13 for this purpose cooperating with a hook 15 rigidly carried by the handle extension 9, while the joint between the cover and container is packed by a yieldable gasket 16, this construction being identical with that described in the above mentioned copending application.

As illustrated, the cover adjacent its center portion is formed with an opening 17. Through this opening extends the screw-threaded shank 19 of a valve seat member, this member having a head 21 drawn tightly against the upper side of the cover by a nut 23 screw-threaded on the shank at the under side of the cover. As shown, a washer 25, of yieldable material, is placed between the nut 23 and the under side of the cover, for rendering fluid tight the joint between the valve seat member and the cover. As shown, the valve seat member is provided with an axial vent passage 27 which is countersunk at its upper end to form a valve seat 29. At its lower end the shank 19 is provided with a reduced diameter extension 31 projecting below the nut 23. The lower end of the extension 31 is formed with cross slots 33 opening laterally into the passage 27 for insuring against leaf-like vegetables or the like clogging the passage 27 when the cooker is in use. At its upper edge the head 21 of the valve seat member is provided with a series of outwardly extending wings or lugs 35 the adjacent ends of which are separated by spaces 37.

For controlling relief of pressure fluid from the container through the vent passage 27 is provided a vertically movable weight valve, this weight valve including a pressure gauge for indicating the pressure within the cooker. As shown, the weight valve comprises an outer casing having a bottom wall 39 carrying a downwardly projecting frusto-conical valve proper 41 adapted to seat on the valve seat 29. This outer casing also comprises an upwardly extending annular wall 43 integral with the bottom wall 39.

The pressure gauge comprises an annular casing 45 closed at its upper end by a crystal 47. As shown, the crystal rests on a yieldable gasket 49 carried by a radially outwardly projecting flange 51 at the upper end of the casing 45, the outer extremity of this flange being turned over, as indicated at 53, to secure the crystal against removal and to hold it tightly against the gasket 49. Beneath the crystal is an indicator hand 55 moved by the gauge mechanism, this hand cooperating with a graduated dial 57 secured by screws 59 to supporting lugs 61 formed integrally with the casing 45. At its lower end the casing 45 is provided with an internal lateral flange 63 on which rests the peripheral portion of a corrugated diaphragm 65, the diaphragm being soldered to the flange, as indicated at 67, so that the bottom of the casing 45 is hermetically sealed. Secured to the center portion of the diaphragm is the end portion of a pin 69 for actuating the internal mechanism (not shown) of the gauge for operating the gauge indicator hand 55.

As shown, the outer casing of the weight valve adjacent the periphery of its bottom wall 39 is formed with an annular groove 71 which receives an annular yieldable gasket ring 73 on which the flange 63 of the gauge casing is adapted to rest when the gauge is placed within the outer casing through the opening presented at the upper portion of the annular wall 43. As shown, this annular wall adjacent its bottom portion is formed with internal screw-threads and the gauge casing with exterior cooperating screw-threads, as indicated at 75, for securing the two together, the turned over portion 53 of the gauge casing conveniently being exteriorly knurled, as indicated at 77, so that the gauge may be readily turned to screw the bottom portion thereof firmly against the gasket 73. When the parts are in assembled relation a chamber 79 is formed between the diaphragm 65 and the bottom wall 39 of the outer casing. This chamber is placed in communication with the passage 27 of the valve seat member by a through passage 81 formed in the valve proper 41, so that when the latter is seated on the valve seat 29 the gauge will indicate the pressure within the pressure cooker.

As illustrated, the under side of the outer casing is shown as provided with downwardly projecting lugs 83 integral therewith, the lower ends of the lugs being slightly spaced, say about one hundredth of an inch, from the upper surface of the cover, as indicated at 84, when the valve proper 41 is seated on the valve seat 29. These lugs at their lower ends have inwardly projecting portions 85 adapted to lie beneath the wings or lugs 35 of the valve seat member in spaced relation thereto when the valve proper 41 is seated. In this way the valve is secured to the cover for limiting upward vertical movement. The shape and size of the lugs 83 and portions 85 thereof are such that they may be passed through the spaces 37 between the wings or lugs 35 of the valve seat member, and then the weight valve rotated to move the portions 85 under the wings or lugs 35, thus enabling the weight valve to be readily attached to and detached from the cover.

As further shown, the cover is struck up to form arcuate raised portions 87 which are aligned with the spaces 37 between the wings or lugs 35 of the valve seat member. The weight valve may be rotated to place it on these raised portions for holding the valve in open position. Conveniently the ends of the raised portions are shaped to form inclined surfaces 89 which permit the lugs 83 and portions 85 thereof to be readily slid on and off them.

In operation the food may be placed in the cooker, the cover secured thereto, and the cooker placed on the stove to heat its contents. The weight valve may then be placed on the cover to rest upon the raised portions 87 of the latter, which, as above explained, holds the valve in open position. Heating the contents of the cooker with the valve open will permit the air in the cooker to escape, completion of such escape being indicated when steam is observed to discharge through the open vent passage. When this occurs the valve may be rotated to move it off the raised portions 87 and cause the inwardly projecting portions 85 of the lugs 83 to move under the wings or lugs 35 of the valve seat member. When a predetermined pressure in the cooker is reached, say fifteen pounds, the valve will rise to vent the cooker and prevent any further rise in pressure, any possibility of the weight valve being forcibly projected upwardly being insured against by reason of the cooperation between the wings or lugs 35 and portions 85 of the weight valve beneath them. Upon completion of the cooking operation the pressure cooker may be completely vented by turning the weight valve to its position in which the valve is held in open position by the raised portions 87 of the cover.

It will be understood that within the scope of the appended claims wide deviations may be made from the form of the invention described without departing from the spirit of the invention.

I claim:

1. A pressure vessel having a pressure relief device comprising a part projecting upwardly from an upwardly facing surface of the vessel, which part is formed with a vent passage for the vessel having an enlarged bore portion opening on the upper surface of said part, said part being provided in spaced relation to said upwardly facing surface of the vessel with a plurality of angularly spaced radially outwardly projecting lugs, said vessel having a plurality of angularly spaced upwardly projecting portions severally aligned with the spaces between said lugs, the tops of which upwardly projecting portions are below the plane of the under sides of said lugs, a weight having a downwardly projecting valve on its under side, which valve is adapted to be rotatably received in said enlarged bore portion of said vent passage and to seat on its walls for controlling said vent passage, said weight carrying a plurality of angularly spaced radially inwardly projecting lugs adapted to rest on said upwardly projecting portions for holding said valve off its seat provided by said enlarged bore portion when said inwardly projecting lugs are inserted in the spaces between said outwardly projecting lugs to place said valve within such bore portion, the valve being adapted to be seated on said seat by the downwardly directed force of said weight when said weight is rotated to move said inwardly projecting lugs off said upwardly projecting portions to place said inwardly projecting lugs under said outwardly projecting lugs.

2. A pressure vessel comprising a body portion and a removable closure, means for sealing the joint between said body portion and closure, a pressure relief device for venting the vessel while said joint is sealed comprising a member carried by said closure projecting upwardly therefrom, which member is formed with a vent passage for the vessel having an enlarged bore portion opening on the upper surface of said member, said member being provided in upwardly spaced relation to the closure with a plurality of angularly spaced radially outwardly projecting lugs, said closure operatively having a plurality of angularly spaced upwardly projecting portions severally aligned with the spaces between said lugs, the tops of which upwardly projecting portions are below the plane of the under sides of said lugs, a weight having a downwardly projecting valve on its under side, which valve is adapted to be rotatably received in said enlarged bore portion of said vent passage and to seat on its walls for controlling said vent passage, said weight carrying a plurality of angularly spaced radially inwardly projecting lugs adapted to rest on said upwardly projecting portions for holding said valve off its seat provided by said enlarged bore portion when said inwardly projecting lugs are inserted in the spaces between said outwardly projecting lugs to place said valve within such bore portion, the valve being adapted to be seated on said seat by the downwardly directed force of said weight when said weight is rotated to move said inwardly projecting lugs off said upwardly projecting portions to place said inwardly projecting lugs under said outwardly projectings lugs.

WILLIAM A. WELDEN.

REFERENCES CITED

The following references are of record in the file of this patent:

UNITED STATES PATENTS

| Number | Name | Date |
|---|---|---|
| 1,474,586 | Hanrahan | Nov. 20, 1923 |
| 2,177,123 | Wittenberg | Oct. 24, 1939 |
| 2,195,132 | Nelson | Mar. 26, 1940 |
| 2,428,483 | Wittenberg | Oct. 7, 1947 |